Feb. 20, 1940.  W. FERRIS  2,190,642
SURFACE BROACHING MACHINE
Filed June 26, 1937  3 Sheets-Sheet 1
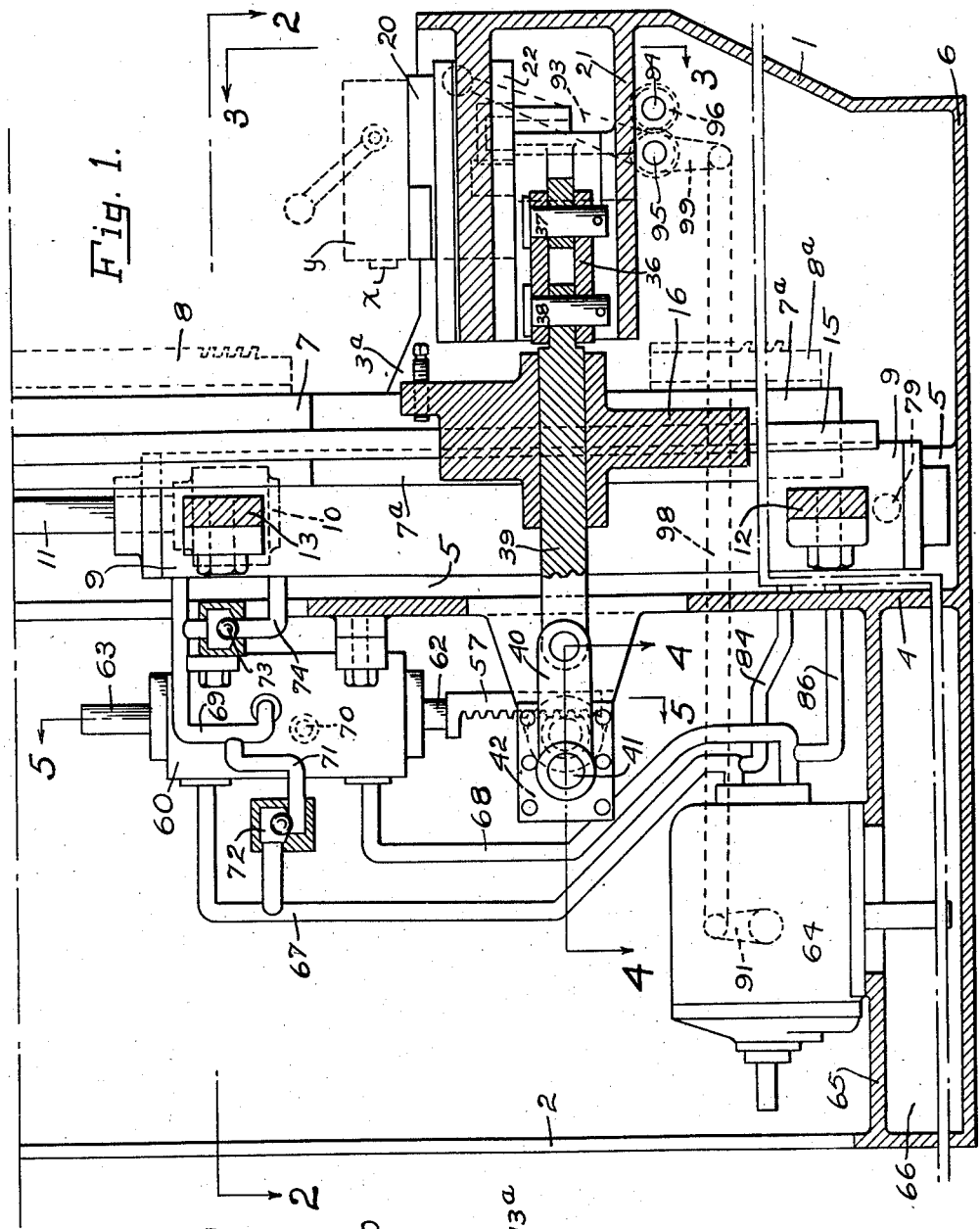
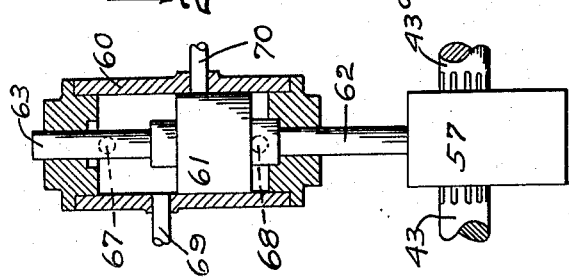
INVENTOR
WALTER FERRIS
BY
ATTORNEY.

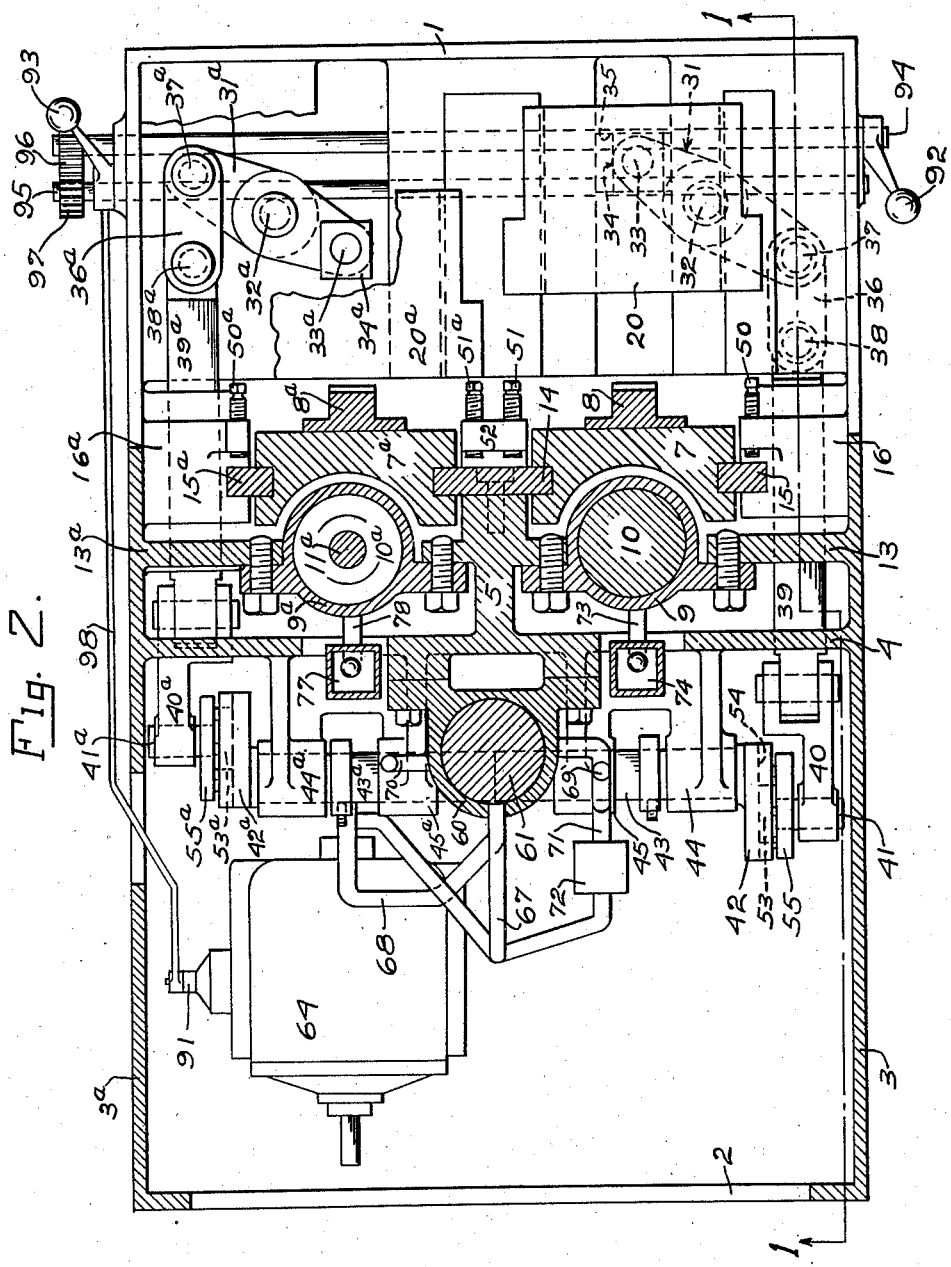

Feb. 20, 1940.   W. FERRIS   2,190,642
SURFACE BROACHING MACHINE
Filed June 26, 1937   3 Sheets-Sheet 3
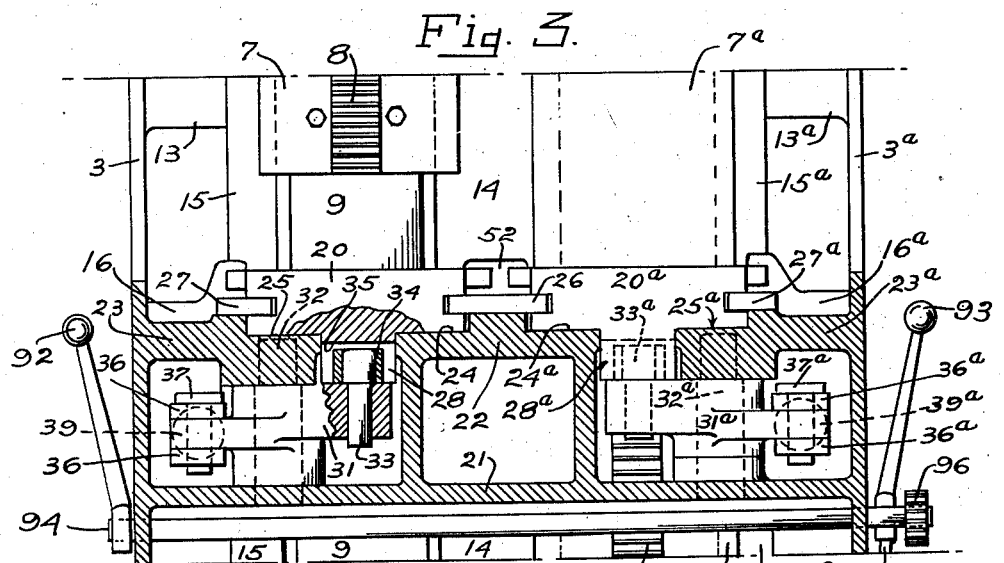
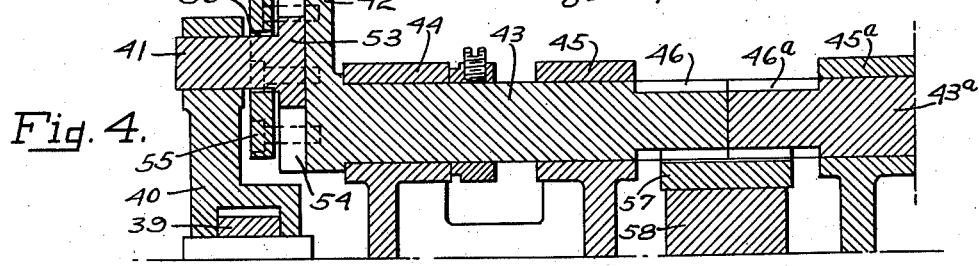
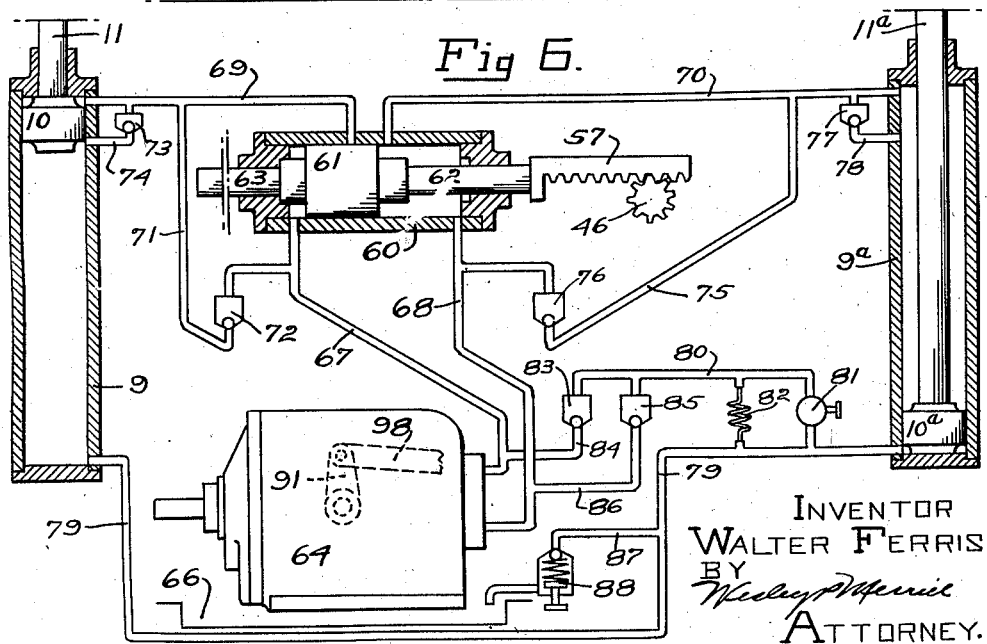
INVENTOR
WALTER FERRIS
BY
ATTORNEY.

Patented Feb. 20, 1940

2,190,642

UNITED STATES PATENT OFFICE 2,190,642

SURFACE BROACHING MACHINE

Walter Ferris, Milwaukee, Wis., assignor to The Oilgear Company, Milwaukee, Wis., a corporation of Wisconsin Application June 26, 1937, Serial No. 150,488

15 Claims. (Cl. 90—33)

This invention relates to machine tools of the type having a tool carrier for moving a tool along a given path and a work carriage for moving work into the path of tool to enable the tool to operate upon the work and then moving the work out of the path of the tool to permit it to be removed from the carriage, such as a surface broaching machine in which a tool is reciprocated and the work is moved into and out of broaching position.

An object of the invention is to provide a machine tool of this character which is positive and precise in operation.

Another object is to provide a machine tool with means having ample power for moving the work carriage into a predetermined position and then holding it exactly in that position without the expenditure of an appreciable amount of power.

Another object is to provide a machine in which the work carriage is gradually accelerated from zero to maximum speed and then gradually decelerated from maximum speed to zero.

Other objects and advantages will appear from the description hereinafter given of a machine in which the invention is embodied.

According to the invention in its general aspect and as ordinarily embodied in practice, a machine is provided with means for moving a tool along a given path, a work carriage for moving the work toward and from the path of the tool, a crank fixed upon a shaft and connected to the work carriage and means for rotating the shaft through a predetermined angular distance in sequence with the movement of the tool.

The invention is exemplified by the surface broaching machine shown somewhat schematically in the accompanying drawings in which the views are as follows:

Fig. 1 is a side view showing the lower part of the machine partly in elevation and partly in section, the view being taken on the irregular line 1—1 of Fig. 2.

Fig. 2 is a sectional plan view taken on the line 2—2 of Fig. 1.

Fig. 3 is a front view showing the lower part of the machine partly in section and partly in elevation, the view being taken on the line 3—3 of Fig. 1.

Fig. 4 is a section through a crank and a shaft which operate a work carriage, the view being taken in the plane of the line 4—4 of Fig. 1 but turned 90° in respect to that figure.

Fig. 5 is a vertical section showing a hydraulic motor and a rack bar which operate the work carriage reciprocating mechanism, the view being taken substantially upon the line 5—5 of Fig. 1 but showing the motor piston and the rack bar in their lower positions.

Fig. 6 is a diagram of the hydraulic circuit.

For the purpose of illustration, the machine has been shown provided with two alternately operating broaching units each of which includes a tool carrier and a work carriage but it is to be understood that the invention is equally applicable to a machine having but one broaching unit. The upper part of the machine has not been illustrated as it is of ordinary construction.

The operating mechanism of the machine is carried by a frame shown as consisting primarily of a front plate 1, a rear plate 2, two side plates 3 and 3ª, a partition 4 arranged between side plates 3 and 3ª and a central column 5 arranged upon the front of partition 4, all of which are arranged upon a base 6 and each part is rigidly secured to the adjoining parts as by being welded thereto or cast integral therewith.

The machine is provided with two tool carriers or slides 7 and 7ª to which broaching tools 8 and 8ª are attached respectively. Slide 7 is adapted to be reciprocated by a hydraulic motor consisting of a power cylinder 9, a piston 10 fitted in cylinder 9 and a piston rod 11 which has its lower end fixed to piston 10 and its upper end connected to slide 7 near the upper end thereof. Slide 7ª is adapted to be reciprocated by a hydraulic motor consisting primarily of a power cylinder 9ª, a piston 10ª fitted in cylinder 9ª and a piston rod 11ª which has its lower end fixed to piston 10ª and its upper end connected to slide 7ª near the upper end thereof. The upper parts of the piston rods and slides have been omitted from the drawings in order to show the operating mechanism on a larger scale.

Power cylinder 9 is arranged upon one side of column 5 and rigidly secured thereto and to a lower lug 12 and an upper lug 13 which are fixed to slide plate 3. Power cylinder 9ª is similarly secured to the other side of column 5 and to a lower lug (not shown) and an upper lug 13ª which are fixed to side plate 3ª.

The adjacent sides of slides 7 and 7ª are slotted and closely fitted upon opposite edges of a central guide bar 14 which is supported by column 5 upon the front thereof. The outer sides of slides 7 and 7ª are slotted and closely fitted, respectively, upon outer guide bars 15 and 15ª which have the lower parts thereof fastened, respectively, in brackets 16 and 16ª fixed to side plates 3 and 3ª. Guide bars 15 and 15ª also have the upper parts thereof fastened to other brackets (not shown) which are also fixed to side plates 3 and 3ª. Guide bars 14, 15 and 15ᵃ form guideways which permit slides 7 and 7ᵃ to be freely reciprocated vertically but prevent them from moving in any other direction.

Tools 8 and 8ᵃ are adapted to operate, respectively, upon work carried by two work carriages 20 and 20ᵃ which are movable in opposite directions simultaneously in sequence with the operation of the tools.

Neither the work nor the manner of fastening it to a carriage forms any part of the present invention. It is therefore deemed sufficient to state that ordinarily each piece of work x is clamped in a fixture y one of which is fixed upon each carriage as indicated by dotted lines in Fig. 1, the fixture being accurately positioned upon the carriage and having means for accurately positioning each piece of work.

The structure for supporting carriages 20 and 20ᵃ forms a part of the frame of the machine and includes a horizontal plate 21 which is joined at its front to front plate 1 and at its sides to side plates 3 and 3ᵃ, a support 22 which is arranged upon plate 21 and joined thereto and to front plate 1, and two horizontal flanges 23 and 23ᵃ which are joined at their front ends to front plate 1 and joined at their outer edges to side plates 3 and 3ᵃ respectively.

Carriage 20 is slidable upon two ways 24 and 25 which are formed, respectively, upon support 22 and flange 23, and carriage 20ᵃ is slidable upon two ways 24ᵃ and 25ᵃ which are formed, respectively, upon support 22 and flange 23ᵃ. The adjacent or inner sides of carriages 20 and 20ᵃ are slotted and fitted upon a guide bar 26 which is attached to support 22, and the outer sides of carriages 20 and 20ᵃ are slotted and fitted, respectively, upon two guide bars 27 and 27ᵃ which are attached to flanges 23 and 23ᵃ respectively.

The ways support the carriages and take the thrust of the tool against the work. The guide bars retain the carriages in position upon the ways and prevent them from tilting due to the cutting force being applied to the work at points beyond the ends of the carriages. Any lateral movement of the carriages is prevented by two ribs 28 and 28ᵃ which are formed, respectively, upon the undersides of carriages 20 and 20ᵃ and closely fitted between the adjacent edges of the ways as best shown in Fig. 3.

Carriage 20 is adapted to be reciprocated by a lever 31 which is pivoted intermediate its ends between plate 21 and flange 23 upon a pivot 32 carried thereby. Lever 31 has a pin 33 arranged in one end thereof and connected to carriage 20 by means of a rectangular block 34 which is journaled upon the upper end of pin 33 and fitted in a slot 35 extending transversely of rib 28 so that, when lever 31 is swung upon pivot 32 to move carriage 20 along ways 24 and 25, block 34 may move along slot 35 transversely of rib 28.

The other end of lever 31 is connected by a pair of links 36 and two pins 37 and 38 to one end of a rod 39 which is slidable in and guided by a suitable bore formed in bracket 16. The other end of rod 39 is connected by a link 40 to a crank pin 41 fixed to a crank arm 42 which is arranged upon the outer end of a shaft 43 journaled in two bearings 44 and 45 carried by partition 4. The inner end of shaft 43 has a gear 46 fixed or formed thereon by means of which the shaft may be rotated.

The arrangement is such that, when shaft 43 is rotated through a given angular distance in one direction or the other, crank pin 41 will transmit motion through the above described linkage to lever 31 which will swing upon pivot 32 and move carriage 20 toward or from the path of tool 8.

The movement of carriage 20 toward the path of tool 8 is limited by two stop screws 50 and 51 which are threaded, respectively, into bracket 16 and into a lug 52 carried by guide bar 14. Screws 50 and 51 are adjusted to stop carriage 20 exactly in the position necessary to enable tool 8 to machine the work to the exact dimensions required.

The thrust of the tool against the work will tend to move carriage 20 away from screws 50 and 51 and thereby transmit a force through the above described linkage to shaft 43. In order to prevent this force from tending to rotate shaft 43, crank pin 41 should be at dead center when carriage 20 is pressed firmly against screws 50 and 51.

Since it would be difficult to so construct a fixture and to so position it upon the carriage that the work would be held exactly in the correct position when crank pin 41 was at dead center, crank pin 41 is provided with a large head 53 which is clamped in adjusted position in a radial slot 54 formed in crank arm 42 as best shown in Fig. 4. Head 53 is clamped in slot 54 by a plate 55 which is bolted to crank arm 42 and provided with an opening 56 through which pin 41 extends and which is slightly larger than pin 41 so that, by loosening the bolts which fasten plate 55 to crank arm 42, head 53 may be moved along slot 54 to vary the throw of the crank, it being understood that only a slight adjustment is necessary for the reason that the fixture is positioned as accurately as possible upon carriage 20.

If a change in the character of the work necessitates a change in the travel of the carriage, plate 55 is replaced with a similar plate having the opening 56 therein so positioned as to locate crank pin 41 at the proper distance from the axis of shaft 43 to obtain the desired travel of the carriage when shaft 43 is rotated through a predetermined angular distance.

The mechanism for operating carriage 20ᵃ is exactly the same as but opposite hand to the above described mechanism for operating carriage 20. Consequently no description thereof will be given, it being deemed sufficient to designate corresponding parts of the two mechanisms by the same reference numerals but with the exponent "a" added to the numerals applied to the several parts of the mechanism which operates carriage 20ᵃ.

Shafts 43 and 43ᵃ are arranged in axial alinement with the adjacent ends thereof in close proximity to each other, and they are adapted to be rotated simultaneously by a single vertically movable rack bar 57 which has rack teeth formed upon its rear face and in mesh with both of gears 46 and 46ᵃ. The front face of rack bar 57 engages an abutment 58 which is carried by partition 4 and holds rack bar 57 in mesh with gears 46 and 46ᵃ.

In order that one work carriage will be retracted when the other is advanced, crank arms 42 and 42ᵃ are spaced apart a predetermined angular distance and shafts 43 and 43ᵃ are rotated through that distance first in one direction and then in the other direction so that the two work carriages are alternately advanced into broaching position and alternately retracted therefrom. Crank arms 42 and 42ª are ordinarily spaced 180° apart in order that each work carriage may be reciprocated through the greatest possible distance.

Rack bar 57 is adapted to be reciprocated by a hydraulic motor consisting of a cylinder 60 which is fixed in a vertical position upon partition 4, a piston 61 which is fitted in cylinder 60 and functions both as a motor piston and as a valve, and a piston rod 62 which connects piston 61 to rack bar 57. Piston 61 is also provided with a tail rod 63 which has the same diameter as piston rod 62 and extends through the opposite end of cylinder 60 in order that cylinder 60 may have the same displacement upon each side of piston 61.

Liquid for operating the hydraulic motor is supplied by a pump 64 arranged upon a horizontal plate 65 which is spaced above base 6 and connected at its edges to side plates 3 and 3ª, rear plate 2 and partition 4. The space below plate 65 constitutes a reservoir 66 from which pump 64 draws its supply of liquid.

The hydraulic motors may be reversed either by means of a reversing valve or by reversing the pump. As shown, pump 64 is reversible and adapted to deliver liquid into one and receive liquid from the other of two channels 67 and 68 which are connected to cylinder 60 at or near the extreme ends thereof as best shown in Fig. 5.

Channels 67 and 68 are adapted to communicate, respectively, with two channels 69 and 70 which have the adjacent ends thereof spaced from each other and connected to cylinder 60 intermediate the ends thereof. The arrangement is such that, when piston 61 is in the position shown in Fig. 6, channel 69 is blocked and channel 70 is open to channel 68 and, when piston 61 is shifted to the other end of cylinder 60, channel 70 will be blocked and channel 69 will be open to channel 67.

The other ends of channels 69 and 70 are connected, respectively, to the upper ends of cylinders 9 and 9ª. Channel 69 is also connected through a channel 71 and a check valve 72 to channel 67 and through a check valve 73 and a channel 74 to cylinder 9 at a point which is below piston 10 when piston 10 is in its uppermost position. Check valves 72 and 73 permit liquid to flow from cylinder 9 through channels 74, 69 and 71 into channel 67 but prevent it from flowing in the opposite direction. Channel 70 is likewise connected through a channel 75 and a check valve 76 to channel 68 and through a check valve 77 and a channel 78 to cylinder 9ª at a point which is below piston 10ª when piston 10ª is in its uppermost position. Check valves 76 and 77 permit liquid to flow from cylinder 9ª through channels 78, 70 and 75 into channel 68 but prevent it from flowing in the opposite direction.

Cylinders 9 and 9ª have the lower ends thereof connected to each other by a channel 79 which is connected to a channel 80 through a manually operated shut off valve 81 and a choke 82. Channel 80 is connected through a check valve 83 and a channel 84 to channel 67 and through a check valve 85 and a channel 86 to channel 68. Channel 79 is also connected through a channel 87 to a relief valve 88 which discharges into reservoir 66.

Shut-off valve 81 and relief valve 88 are provided in order that the stroke of the machine may be varied as will presently be explained. Choke 82, channels 80, 84 and 86 and check valves 83 and 85 are provided in order to insure that the upward moving piston will reach the end of its up stroke before the downward moving piston reaches the end of its down stroke.

The operation of the machine is controlled by a lever 91 which is arranged upon pump 64 and connected to the stroke changing mechanism thereof. When lever 91 is in its central or neutral position as shown in Figs. 1 and 6, pump 64 will be at zero stroke and no liquid will be delivered thereby so that the machine remains idle. When lever 91 is shifted in one direction or the other from its neutral position, pump 64 will deliver liquid into channel 67 or channel 68 depending upon the direction in which lever 91 is shifted.

Lever 91 is adapted to be shifted by either one of two hand levers 92 and 93 arranged upon opposite sides of the machine at the front thereof and fixed, respectively, upon two shafts 94 and 95 which are journaled in the frame. Shaft 94 has a gear 96 fixed thereon and in mesh with a gear 97 which is fixed upon shaft 95 so that, when one shaft is rotated by means of the lever fixed thereon the other shaft will be rotated in the opposite direction.

For the purpose of illustration, lever 91 has been shown as being connected by a link 98 directly to an arm 99 formed integral with lever 93 so that pump 64 is controlled solely by levers 92 and 93. In practice, however, pump 64 has its displacement automatically reduced to zero at the end of each half-cycle of operation by a suitable link and lever mechanism which is operated by cams or dogs carried by slides 7 and 7ª, the link and lever mechanism being operated to swing lever 91 into its neutral position each time a tool slide reaches the limit of its down stroke. Since the mechanism for reducing the displacement of a pump to zero or for shifting a reversing valve into neutral position is well known in the art and forms no part of the present invention, it has been omitted from the drawings to avoid complicating the views.

Operation

Assuming that the several parts are in the positions shown, that a piece of work $x$ has been clamped to the fixture $y$ on carriage 20, and that swinging the hand lever on one side of the machine forward will cause pump 64 to deliver liquid in a direction to effect a downward movement of the tool slide on the same side of the machine, the operation will be as follows:

The operator will first swing the lever 92 forward and thereby cause pump 64 to deliver liquid into channel 67. This liquid will flow through channel 67 to cylinder 60 and move piston 61 from the position shown in Fig. 6 to the position shown in Fig. 5. Rack bar 57 will be moved by piston 61 downward in respect to Figs. 1 and 5 and rotate shafts 43 and 43ª and thereby cause carriage 20 to be advanced toward the path of tool 8 and carriage 20ª to be retracted from the path of tool 8ª.

The movement of piston 61 is just sufficient to rotate shafts 43 and 43ª through 180° and swing each crank pin 41 from dead center at one side of the shaft axis to dead center at the other side of the shaft axis. The throw of crank pin 41 is such that carriage 20 engages stop screws 50 and 51 just before crank pin 41 reaches dead center and then the movement of crank pin 41 from that point to dead center presses carriage 20 firmly against stop screws 50 and 51 and takes up any lost motion or slack that may exist in the carriage reciprocating mechanism.

As soon as piston 61 moves a short distance, it blocks channel 70 and, when it reaches the end of its movement, it uncovers the end of channel 69. Liquid from pump 64 may then flow through channel 67, cylinder 60 and channel 69 to the upper end of cylinder 9 and move piston 10 downward on a working stroke, thereby moving tool slide 7 downward and causing tool 8 to take a cut from work $x$.

By rotating shaft 43 until crank pin 41 is at dead center, the thrust of the tool against the work is taken by bearings 44 and 45 so that little, if any, rotative force is transmitted to shaft 43. Consequently, no appreciable amount of power is required to prevent shaft 43 from rotating.

As piston 10 moves downward, it ejects liquid from the lower part of cylinder 9, and this liquid flows through channel 79 to the lower end of cylinder $9^a$ and raises piston $10^a$, thereby causing tool slide $7^a$ to move upward simultaneously with the downward movement of tool slide 7. Piston $10^a$ in moving upward will eject liquid from the upper part of cylinder $9^a$ through channels 70 and 75 and check valve 76 into channel 68 which at this time constitutes the return channel to pump 64.

Since the displacements of cylinders 9 and $9^a$ are the same, the liquid ejected from cylinder 9 tends to move piston $10^a$ upward at substantially the same rate that piston 10 moves downward but, at the same time, liquid from pump 64 will flow through channels 67 and 84, check valve 83, channel 80, choke 82 and channel 79 into the lower end of cylinder $9^a$ at a limited rate and cause piston $10^a$ to rise at a rate slightly greater than the rate at which piston 10 descends. Consequently, piston $10^a$ will reach the end of its up stroke before piston 10 reaches the end of its down stroke.

When piston $10^a$ reaches the end of its up stroke, it will uncover the end of channel 78 and then the liquid supplied to the lower end of cylinder $9^a$ during continued downward movement of piston 10 flows through channel 78, check valve 77, channels 70 and 75 and check valve 76 into return channel 68.

When piston 10 reaches the end of its down stroke, at which time tool 8 has completed the operation on the work, the displacement of pump 64 is reduced to zero and the machine comes to rest, thereby completing a half-cycle of operation during which the operator clamps a piece of work in the fixture on carriage $20^a$.

The operator then swings lever 93 forward to start a second half-cycle of operation which is exactly the reverse of the above described half-cycle. Liquid from pump 64 then flows through channel 68 to cylinder 60 and moves piston 61 from the position shown in Fig. 5 to the position shown in Fig. 6, thereby moving rack bar 57 upward in respect to Figs. 1 and 5. Rack bar 57 will rotate shafts 43 and $43^a$ through 180° and thereby cause carriage $20^a$ to be advanced into contact with stop screws $50^a$ and $51^a$ so that the new piece of work is in broaching position and causing carriage 20 to be retracted so that the finished work may be removed therefrom and replaced with a new piece of work.

As soon as piston 61 moves a short distance, it blocks channel 69 and, when it reaches the end of its movement, it uncovers the end of channel 70. Liquid from pump 64 may then flow through channel 68, cylinder 60 and channel 70 to the upper end of cylinder $9^a$ and move piston $10^a$ downward on a working stroke, thereby moving tool slide $7^a$ downward and causing tool $8^a$ to take a cut from the work on carriage $20^a$.

As piston $10^a$ moves downward, it ejects liquid from the lower part of cylinder $9^a$, and this liquid flows through channel 79 to the lower end of cylinder 9 and raises piston 10, thereby causing tool slide 7 to move upward simultaneously with the downward movement of tool slide $7^a$. Piston 10 in moving upward will eject liquid from the upper part of cylinder 9 through channels 69 and 71 and check valve 72 into channel 67 which at this time constitutes the return channel to pump 64.

At the same time, liquid from pump 64 will flow through channels 68 and 86, check valve 85, channel 80, choke 82 and channel 79 into the lower end of cylinder 9 at a limited rate and cause piston 10 to rise at a rate slightly greater than the rate at which piston $10^a$ descends. Consequently, piston 10 will reach the end of its upward stroke before piston $10^a$ reaches the end of its down stroke. When piston 10 reaches its upper limit, it uncovers the end of channel 74 and then the liquid supplied to the lower end of cylinder 9 during continued downward movement of piston $10^a$ flows through channel 74, check valve 73, channels 69 and 71 and check valve 72 into return channel 67.

When piston $10^a$ reaches the end of its down stroke, at which time tool $8^a$ has completed its operation upon the work, the displacement of pump 64 is reduced to zero and the machine comes to rest, thereby completing the second half of a complete cycle of operation. The operator may then operate lever 92 to initiate another cycle of operation.

If it is desired to shorten the stroke of the machine, valve 81 is opened to permit liquid to flow through channel 79 and raise the piston which is at the end of its down stroke. For example, if the parts are in the positions shown in Fig. 6 and the stroke is to be shortened, valve 81 is opened and lever 91 is operated to cause pump 64 to deliver liquid into channel 68. Pressure will extend from channel 68 through channel 80, valve 81 and channel 79 to the lower ends of cylinder 9 and $9^a$ and act upon the lower faces of pistons 10 and $10^a$. Pressure will also extend from channel 68 through cylinder 60 and channel 70 to the upper end of cylinder $9^a$ and act upon the upper face of piston $10^a$.

If piston 10 is not at its upper limit, piston $10^a$ will at first remain stationary and piston 10 will move upward until it stalls against the upper end of cylinder 9 due to the fact that only the lower face of piston 10 is exposed to pump pressure while both faces of piston $10^a$ are exposed to pump pressure. The liquid above piston 10 will be expelled through channels 69 and 71 and check valve 72 into return channel 67.

When piston 10 stalls, liquid may escape from the lower part of cylinder 9 through channel 74 and check valve 73 into channel 69 but the flow therethrough is throttled, as by piston 10 covering a large part of the area of channel 74, so that only a part of the liquid delivered by pump 64 may escape therethrough. Consequently, pump pressure rises and piston $10^a$ is moved upward by the preponderance of force acting upon its lower face, liquid from above piston $10^a$ being ejected through channels 70 and 75 and check valve 76 into channel 68.

The displacement of pump 64 may be reduced to zero to stop piston 10ᵃ when it has been raised a desired distance but the piston is ordinarily permitted to stall against the upper end of the cylinder. The dogs or cams on tool slides 7 and 7ᵃ are then adjusted to the desired stroke.

If both pistons are in their uppermost positions, pump 64 may be adjusted to deliver liquid to the upper end of either cylinder 9 or 9ᵃ to force the piston therein downward. Since the other piston is at the end of its up stroke, all liquid expelled by the downward moving piston from its cylinder will be exhausted through relief valve 88. If piston 10ᵃ has not been raised to its upper limit, pump 64 will be adjusted to deliver liquid to move piston 10 downward, and the liquid expelled by piston 10 from cylinder 9 will flow through channel 79 to cylinder 9ᵃ and raise piston 10ᵃ until it stalls at the end of its up stroke and then piston 10 will expel liquid through relief valve 88. Thereafter, the machine will operate as described above but at a shorter stroke. If it is then desired to lengthen the stroke, it is simply necessary to adjust the dogs or cams on tool slides 7 and 7ᵃ and then the excess liquid below pistons 10 and 10ᵃ will be expelled through relief valve 88.

The invention herein set forth is susceptible of various modifications without departing from the scope thereof as hereafter claimed.

The invention is hereby claimed as follows:

1. In a machine having a slide for carrying a tool, means for moving said slide along a predetermined path, a work carriage movable at right angles to the path of said tool, and a stop for limiting the movement of said carriage toward said path, the combination of a shaft, a crank fixed upon said shaft and connected to said carriage for moving it against and away from said stop during rotation of said shaft, and means for rotating said shaft in sequence with the operation of said slide moving means.

2. In a machine having a slide for carrying a tool, a hydraulic motor for reciprocating said slide, a work carriage movable at right angles to the path of said tool, and a stop for limiting the movement of said carriage toward said path, the combination of a shaft, a crank fixed upon said shaft and connected to said carriage for moving it against and away from said stop during rotation of said shaft, and means including a hydraulic motor connected in series with said slide reciprocating motor for rotating said shaft in sequence with the operation of said slide.

3. In a machine having a slide for carrying a tool, means for moving said slide along a predetermined path and a work carriage movable at right angles to the path of said tool for presenting work to said tool to enable it to operate thereon, the combination of a shaft, a crank fixed upon said shaft and connected to said carriage for moving it toward and from the path of said tool during rotation of said shaft, means for rotating said shaft through a predetermined angular distance in sequence with the operation of said slide moving means, and means for stopping said shaft with said crank in such a position that the thrust of the tool against the work reacts upon said shaft along a line substantially coincident with the axis of said crank to thereby prevent said thrust from causing a material rotative force to be transmitted to said shaft.

4. In a machine having a slide for carrying a tool, a hydraulic motor for reciprocating said slide and a work carriage movable at right angles to the path of said tool for presenting work to said cutting tool to enable it to operate thereon, the combination of a shaft, a crank fixed upon said shaft and connected to said carriage for moving it toward and from the path of said tool during rotation of said shaft, means including a hydraulic motor connected in series with said slide reciprocating motor for rotating said shaft through a predetermined angular distance in sequence with the operation of said slide, and means for stopping said shaft with said crank in such a position that the thrust of the tool against the work reacts upon said shaft along a line substantially coincident with the axis of said crank to thereby prevent said thrust from causing a material rotative force to be transmitted to said shaft.

5. In a machine having a tool slide and a tool fixed upon said slide, the combination of a hydraulic motor connected to said slide for reciprocating the same and including a power cylinder and a piston fitted in said cylinder, a work carriage for advancing work into the path of said tool to enable said tool to operate thereon and for retracting said work from said path, a stop for limiting the movement of said carriage toward said path to thereby stop said work in position to be operated upon by said tool, a shaft, a crank fixed upon said shaft and connected to said carriage for reciprocating said carriage into and out of contact with said stop during rotation of said shaft in one direction or the other, a gear fixed upon said shaft, a rack meshing with said gear, a second cylinder, a piston fitted in said second cylinder and connected to said rack for reciprocating the same to thereby rotate said shaft, and means for delivering motive liquid to said cylinders in sequence to thereby effect operation of said carriage and said slide in sequence.

6. In a machine having a tool slide and a tool fixed upon said slide, the combination of a hydraulic motor connected to said slide for reciprocating the same and including a power cylinder and a piston fitted in said cylinder, a work carriage for advancing work into the path of said tool to enable said tool to operate thereon and for retracting said work from said path, a stop for limiting the movement of said carriage toward said path to thereby stop said work in position to be operated upon by said tool, a shaft, a crank fixed upon said shaft and connected to said carriage for reciprocating said carriage into and out of contact with said stop during rotation of said shaft in one direction or the other, a gear fixed upon said shaft, a rack meshing with said gear, a source of motive liquid, means connecting said power cylinder to said source including a second cylinder, a piston fitted in said second cylinder and connected to said rack for reciprocating the same to thereby rotate said shaft and also functioning as a valve for controlling the flow of liquid from said source to said power cylinder, and means for controlling the delivery of liquid from said source to said cylinder.

7. In a machine having a tool slide and a tool fixed upon said slide, the combination of a hydraulic motor connected to said slide for reciprocating the same and including a power cylinder and a piston fitted in said cylinder, a work carriage for advancing work into the path of said tool to enable said tool to operate thereon and for retracting said work from said path, a shaft, a crank fixed upon said shaft and connected to said carriage for reciprocating said carriage during rotation of said shaft, a gear fixed upon said shaft, a rack meshing with said gear, a second cylinder, a piston fitted in said second cylinder and connected to said rack for reciprocating the same to thereby rotate said shaft, means for delivering motive liquid to said cylinders in sequence to thereby effect operation of said carriage and said slide in sequence, and means for stopping said shaft with said crank in such a position that the thrust of the tool against the work reacts upon said shaft along a line substantially coincident with the axis of said crank to thereby prevent said thrust from causing a material rotative force to be transmitted to said shaft.

8. In a machine having a tool slide and a tool fixed upon said slide, the combination of a hydraulic motor connected to said slide for reciprocating the same and including a power cylinder and a piston fitted in said cylinder, a work carriage for advancing work into the path of said tool to enable said tool to operate thereon and for retracting said work from said path, a shaft, a crank fixed upon said shaft and connected to said carriage for reciprocating said carriage during rotation of said shaft, a gear fixed upon said shaft, a rack meshing with said gear, a source of motive liquid, means connecting said power cylinder to said source including a second cylinder, a piston fitted in said second cylinder and connected to said rack for reciprocating the same to thereby rotate said shaft and also functioning as a valve for controlling the flow of liquid from said source to said power cylinder, means for controlling the delivery of liquid from said source to said cylinders, and means for stopping said shaft with said crank in such a position that the thrust of the tool against the work reacts upon said shaft along a line substantially coincident with the axis of said crank to thereby prevent said thrust from causing a material rotative force to be transmitted to said shaft.

9. In a machine having two cutting tools, means for simultaneously advancing one and retracting the other of said tools, and two work carriages for advancing work into the paths of said tools alternately to enable each tool as it advances to operate upon said work, the combination of rotatable means, a crank fixed upon said rotatable means and having its free end connected to one carriage, a second crank fixed upon said rotatable means and having its free end connected to the other carriage, the free ends of said cranks being spaced a predetermined angular distance from each other to thereby cause one of said carriages to be advanced toward the path of one of said tools and the other of said carriages simultaneously retracted from the path of the other of said tools during rotation of said rotatable means, and means operable in sequence with said tool operating means for rotating said rotatable means through a predetermined angular distance.

10. In a machine having two cutting tools and two work carriages for advancing work into the paths of said tools alternately to enable each tool as it advances to operate upon said work, the combination of two reciprocating hydraulic motors connected in series with each other for simultaneously advancing one and retracting the other of said tools, rotatable means, a crank fixed upon said rotatable means and having its free end connected to one carriage, a second crank fixed upon said rotatable means and having its free end connected to the other carriage, the free ends of said cranks being spaced a predetermined angular distance from each other to thereby cause one of said carriages to be advanced toward the path of one of said tools and the other of said carriages simultaneously retracted from the path of the other of said tools during rotation of said rotatable means, a source of motive liquid connected to said motors, and a third hydraulic motor hydraulically connected between said source and said tool operating motors for rotating said rotatable means through a predetermined angular distance in sequence with the operation of said tools.

11. In a machine having two cutting tools, means for simultaneously advancing one and retracting the other of said tools, and two work carriages for advancing work into the paths of said tools alternately to enable each tool as it advances to operate upon said work, the combination of two shafts arranged in axial alinement and having gears fixed upon the adjacent ends thereof, a single rack engaging both of said gears for rotating both of said shafts simultaneously, a crank fixed upon one of said shafts and having its free end connected to one carriage, a second crank fixed upon the other shaft and having its free end connected to the other carriage, the free ends of said cranks being spaced a predetermined angular distance from each other to thereby cause one of said carriages to be advanced toward the path of one of said tools and the other of said carriages simultaneously retracted from the path of the other of said tools during simultaneous rotation of said shafts, and means operable in sequence with said tool operating means for causing said rack to rotate said shafts through a predetermined angular distance.

12. In a machine having two cutting tools, means for simultaneously advancing one and retracting the other of said tools, and two work carriages for advancing work into the paths of said tools alternately to enable each tool as it advances to operate upon said work, the combination of rotatable means, a crank fixed upon said rotatable means and having its free end connected to one carriage, a second crank fixed upon said rotatable means and having its free end connected to the other carriage, the free ends of said cranks being spaced a predetermined angular distance from each other to thereby cause one of said carriages to be advanced toward the path of one of said tools and the other of said carriages simultaneously retracted from the path of the other of said tools during rotation of said rotatable means, means operable in sequence with said tool operating means for rotating said rotatable means through a predetermined angular distance, and means for stopping rotation of said rotatable means upon the crank connected to the advancing carriage reaching a position in which its axis substantially coincides with the line along which the reaction of the tool against the work on the advanced carriage is transmitted to said rotatable means to thereby prevent said thrust from causing a material rotative force to be transmitted to said rotatable means.

13. In a machine having two cutting tools and two work carriages for advancing work into the paths of said tools alternately to enable each tool as it advances to operate upon said work, the combination of two reciprocating hydraulic motors connected in series with each other for simultaneously advancing one and retracting the other of said tools, rotatable means, a crank fixed upon said rotatable means and having its free end connected to one carriage, a second crank fixed upon said rotatable means and having its free end connected to the other carriage, the free ends of said cranks being spaced a predetermined angular distance from each other to thereby cause one of said carriages to be advanced toward the path of one of said tools and the other of said carriages simultaneously retracted from the path of the other of said tools during rotation of said rotatable means, a source of motive liquid connected to said motors, a third hydraulic motor hydraulically connected between said source and said tool operating motors for rotating said rotatable means through a predetermined angular distance in sequence with the operation of said tools, and means for stopping rotation of said rotatable means upon the crank connected to the advancing carriage reaching a position in which its axis substantially coincides with the line along which the reaction of the tool against the work on the advanced carriage is transmitted to said rotatable means to thereby prevent said thrust from causing a material rotative force to be transmitted to said rotatable means.

14. In a machine having two cutting tools and two work carriages for advancing work into the paths of said tools alternately to enable each tool as it advances to operate upon said work, the combination of two reciprocating hydraulic motors connected in series with each other for simultaneously advancing one and retracting the other of said tools, rotatable means, a crank fixed upon said rotatable means and having its free end connected to one carriage, a second crank fixed upon said rotatable means and having its free end connected to the other carriage, the free ends of said cranks being spaced a predetermined angular distance from each other to thereby cause one of said carriages to be advanced toward the path of one of said tools and the other of said carriages simultaneously retracted from the path of the other of said tools during rotation of said rotatable means, means for rotating said rotatable means including a rack and a pinion, a source of motive liquid, means connecting said motors to said source including a cylinder, a piston fitted in said cylinder and connected to said rack to reciprocate the same and thereby rotate said rotatable means and also functioning as a valve to control the flow of liquid from said source to said motors, and means for controlling the delivery of liquid from said source to said cylinder.

15. In a machine having two cutting tools and two work carriages for advancing work into the paths of said tools alternately to enable each tool as it advances to operate upon said work, the combination of two reciprocating hydraulic motors connected in series with each other for simultaneously advancing one and retracting the other of said tools, rotatable means, a crank fixed upon said rotatable means and having its free end connected to one carriage, a second crank fixed upon said rotatable means and having its free end connected to the other carriage, the free ends of said cranks being spaced a predetermined angular distance from each other to thereby cause one of said carriages to be advanced toward the path of one of said tools and the other of said carriages simultaneously retracted from the path of the other of said tools during rotation of said rotatable means, means for rotating said rotatable means including a rack and a pinion, a source of motive liquid, means connecting said motors to said source including a cylinder, a piston fitted in said cylinder and connected to said rack to reciprocate the same and thereby rotate said rotatable means and also functioning as a valve to control the flow of liquid from said source to said motors, means for controlling the delivery of liquid from said source to said cylinder, and means for stopping rotation of said rotatable means upon the crank connected to the advancing carriage reaching a position in which its axis substantially coincides with the line along which the reaction of the tool against the work on the advanced carriage is transmitted to said rotatable means to thereby prevent said thrust from causing a material rotative force to be transmitted to said rotatable means.

WALTER FERRIS.